(12) United States Patent
Iwatsuki

(10) Patent No.: US 6,543,979 B2
(45) Date of Patent: Apr. 8, 2003

(54) CLINCH NUT ASSEMBLY AND METHOD OF PRODUCING CLINCH NUT

(75) Inventor: Shuuichiro Iwatsuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/828,509

(22) Filed: Apr. 6, 2001

(65) Prior Publication Data

US 2001/0031188 A1 Oct. 18, 2001

(30) Foreign Application Priority Data

Apr. 18, 2000 (JP) ........................................ 2000-116219
Jun. 7, 2000 (JP) ........................................ 2000-169942

(51) Int. Cl.⁷ ................................................ F16B 37/04
(52) U.S. Cl. ...................................... 411/180; 29/522.1
(58) Field of Search ................... 411/180, 181, 411/183, 533; 29/432.2, 522.1

(56) References Cited

U.S. PATENT DOCUMENTS

| | | | | |
|---|---|---|---|---|
| 1,757,143 A | * | 5/1930 | Renner | 411/177 |
| 2,110,039 A | * | 3/1938 | Double | 29/509 |
| 3,393,724 A | * | 7/1968 | Joffe | 29/432 |
| 3,878,599 A | * | 4/1975 | Ladouceur et al. | 29/432.2 |
| 6,276,040 B1 | * | 8/2001 | Muller | 29/432.2 |
| 6,325,580 B1 | * | 12/2001 | Diamond | 411/183 |

FOREIGN PATENT DOCUMENTS

| | | | | |
|---|---|---|---|---|
| GB | 2064046 A | * | 6/1981 | ........... F16B/37/04 |
| JP | 60-252814 | | 12/1985 | |
| JP | 11-193808 | | 7/1999 | |

* cited by examiner

Primary Examiner—Flemming Saether
Assistant Examiner—Jori Schiffman
(74) Attorney, Agent, or Firm—Merchant & Gould P.C.

(57) ABSTRACT

A clinch nut assembly is disclosed. The clinch nut assembly includes: a sheet metal PL having a bolt insertion hole BH; and a clinch nut 1, 2, 4, 6, 8 and 11 to be fixed to the sheet metal. The clinch nut is provided with a recess portion 1C, 2C, 4C, 6C, 8C and 11C at one end 1B, 2B, 4B, 6B, 8B and 11B facing to the sheet metal so as to receive a tubular projection C formed around the bolt insertion hole. Further, an engaging part 1D, 4D, 6D and 11D is provided around a peripheral wall of the recess portion for interlocking with the tubular projection.

5 Claims, 9 Drawing Sheets

CLINCH NUT ASSEMBLY AND METHOD OF PRODUCING CLINCH NUT

FIELD OF THE INVENTION

The present invention relates to a clinch nut assembly and a method of producing a clinch nut, and more particularly to a clinch nut assembly, in which a clinch nut is previously fixed to a sheet metal, and a method of producing such a clinch nut.

BACKGROUND OF THE INVENTION

As a nut previously fixed to a sheet metal, Japanese Laid-open Patent Publication No.sho.60-252814 discloses a clinch nut. As shown in FIG. 16, the clinch nut 51 comprises, on a bottom end surface facing to a sheet metal, an internal cylindrical portion 52 with a screw hole 53 for punching the sheet metal in order to provide a bolt insertion hole in the sheet metal and an external cylindrical portion 54. An annular groove 56 is formed coaxially with the screw hole 53 and between the internal cylindrical portion 52 and the external cylindrical portion 54. The external cylindrical portion 54 is shorter than the internal cylindrical 20 portion 52, and the inner peripheral surface 55 of the external cylindrical portion 54 is provided with an engaging part, which is of a reverse tapered shape extending from the bottom end surface, for interlocking with the periphery of the bolt insertion hole of the sheet metal.

As a nut having a similar construction to the aforementioned clinch nut 51, Japanese Laid-open Patent Publication No. Hei 11-193808 discloses a pierce nut. As shown in FIG. 17, the pierce nut 61 comprises an internal cylindrical portion 62, an external cylindrical portion 64 and an annular groove 66 formed between the internal cylindrical portion 62 and the external cylindrical portion 64. The outer peripheral surface 63 of the internal cylindrical portion 62 is provided with an engaging part, which is of a reverse tapered shape extending toward the end facing to the sheet metal, for interlocking with the periphery of the bolt insertion hole. The external cylindrical portion 64 has an enlarged end surface abutting to the sheet metal.

However, since these clinch nut 51 and pierce nut 61 have a construction, in which the internal cylindrical portion 52, 62 and the external cylindrical portion 54, 64 are separatedby the annular groove 56, 66, the nut 51, 61 tends to be enlarged in its profile toward the radial direction. As a result, when positioning a plurality of nuts 51, 61 in an adjacent manner, the pitch interval of the respective adjacent nuts 51, 61 becomes lager. Therefore, a problem will arise when fixing a plurality of nuts 51, 61 to a smaller sheet metal such as a small-sized bracket or flange. Meanwhile, if the diameter of the clinch nut 51 and the pierce nut 61 is reduced, the contacting area of the end surface of the external cylindrical portion 54, 64, which abuts to the sheet metal, becomes smaller and hence the joint strength between the nut 51, 61 and the sheet metal is restricted.

With the aforementioned drawbacks of the prior art in view, the present invention seeks to provide a clinch nut assembly, in which a clinch nut can be reduced its size while ensuring a sufficient contacting area with regard to the sheet metal, so that the nut can be firmly fixed to the sheet metal. The present invention also seeks to provide a method for readily producing a clinch nut adapted to use with the clinch nut assembly.

SUMMARY OF THE INVENTION

According to a first aspect of the invention, there is provided a clinch nut assembly comprising:

a sheet metal having a bolt insertion hole; and a clinch nut to be fixed to said sheet metal, wherein said clinch nut is provided with a recess portion at one end facing to the sheet metal so as to receive a tubular projection formed around the bolt insertion hole, and wherein an engaging part is provided around a peripheral wall of said recess portion for interlocking with said tubular projection.

In such a clinch nut assembly, the tubular projection formed around the bolt insertion hole of the sheet metal is fitted into the recess portion provided at one end of the clinch nut, and the tubular projection is forcibly deformed so as to interlock with the engaging part around the peripheral wall of the recess portion. The clinch nut is thereby fixed to the sheet metal with the whole end surface of the clinch nut contacting with the sheet metal.

According to a second aspect of the invention, there is provided a clinch nut assembly comprising:

a sheet metal having a bolt insertion hole;

a clinch nut to be fixed to said sheet metal, the clinch nut including a recess portion at one end facing to the sheet metal so as to receive a tubular projection formed around the bolt insertion hole; and a washer member fixed to said end of the clinch nut, an inner periphery of the washer member extending inwardly from a peripheral wall of said recess portion so as to form an engaging part for interlocking with said tubular projection.

In such a clinch nut assembly, the tubular projection formed around the bolt insertion hole of the sheet metal is fitted into the recess portion provided at one end of the clinch nut, and the tubular projection is forcibly deformed so as to interlock with the inner periphery of the washer member extending inwardly from the peripheral wall of the recess portion. The clinch nut is thereby fixed to the sheet metal with the whole end surface of the washer member contacting with the sheet metal.

The term "washer member" in this aspect of the invention indicates a plate-like member having a circular hole, which allows an insertion of the tubular projection of the sheet metal. Usually, the outer profile of the washer member is of circular shape, however, a polygonal shape, such as a square and a hexagon may be employed. The outside dimension of the washer member is decided in accordance with the outside dimension of the clinch nut so that the washer member has substantially the same or slightly greater dimension compared to the clinch nut. The diameter and the thickness of the hole of the washer member are decided in accordance with the thickness of the sheet metal. They may vary as long as retaining a function as an engaging part for interlocking with the tubular projection. The washer member is fixed to the end of the clinch nut by means of resistance welding and the like. For this reason, the washer member is preferably made of the same material as the clinch nut.

According to a third aspect of the invention, the aforementioned clinch nut assemblies further include a flange up washer with a reinforcement tubular projection, and said reinforcement tubular projection pressing an inner peripheral surface of the tubular projection of said sheet metal for interlocking said tubular projection with the clinch nut.

In such a clinch nut assemblies, since the reinforcement tubular projection of the flange up washer presses the inner peripheral surface of the tubular projection of the sheet metal, the clinch nut is more firmly fixed to the sheet metal.

The term "flange up washer" in this aspect of the invention indicates a washer, in which a reinforcement tubular projection is formed by way of fluing or flanging up at a center of its flange portion for insertion of a bolt. The reinforcement tubular projection of the flange up washer may be formed together with the tubular projection of the sheet metal with the flange portion attached to the sheet metal. Alternatively, the reinforcement tubular projection may be formed previously and individually. The flange up washer is preferably made of steel with high stiffness so as to firmly retain the interlocking state with regard to the tubular projection of the sheet metal. The flange portion of the flange up washer is not limited to a circular shape and may be polygonal, such as square and hexagonal. However, it is usually formed as a circular shape with substantially the same outside dimension of the clinch nut.

According to a fourth aspect of the invention, the clinch nut assembly according to the first aspect of the invention is characterized in that the sheet metal has a plurality of adjacent bolt insertion holes, and that a flange up washer plate with a plurality of reinforcement tubular projections is attached to the sheet metal in such a way that each of said plurality of reinforcement tubular projections presses an inner peripheral surface of the corresponding tubular projection for interlocking the tubular projection with the clinch nut.

In such a clinch nut assembly, since the flange up washer plate is attached to the sheet metal in such a way that each of the plurality of reinforcement tubular projections presses the inner peripheral surface of the corresponding tubular projection, a plurality of clinch nuts are adjacent to each other and they are more firmly fixed to the sheet metal.

The term "flange up washer plate" indicates a plate member having a plurality of reinforcement tubular projections, such as the reinforcement tubular projection of the flange up washer according to the third aspect of the invention. Similar to the reinforcement tubular projection of the flange up washer, the plurality of reinforcement tubular projections of the flange up washer plate are formed by way of fluing. Also, similar to the flange up washer, the flange up washer plate is preferably made of steel with high stiffness.

In the clinch nut assembly in which the flange up washer or the flange up washer plate is attached to the clinch nut, a front end of the reinforcement tubular projection may be bent outwardly so as to encompass the tubular projection of the sheet metal. In such a clinch nut assembly, since the front end of the reinforcement tubular projection provided on the flange up washer or the flange up washer plate as well as the tubular projection of the sheet metal is engaged with the peripheral wall of the recess portion of the clinch nut, the clinch nut is more firmly fixed to the sheet metal.

According to a fifth aspect of the invention, there is provided a clinch nut assembly comprising:
a sheet metal having a bolt insertion hole;
a clinch nut to be fixed to said sheet metal; and
a flange up washer with a reinforcement tubular projection,
wherein said clinch nut includes a recess portion at one end facing to the sheet metal so as to receive said reinforcement tubular projection which is inserted through the bolt insertion hole of said sheet metal, and wherein an engaging part is provided around a peripheral wall of said recess portion for interlocking with the reinforcement tubular projection of said flange up washer in such a way that the sheet metal is retained between said one end of the clinch nut and a flange portion of said flange up washer.

In such a clinch nut assembly, the reinforcement tubular projection of the flange up washer is inserted through the bolt insertion hole of the sheet metal and is fitted into the recess portion formed at one end of the clinch nut, and then the reinforcement tubular projection is forcibly deformed so as to interlock with the engaging part provided around the peripheral wall of the recess portion. Therefore, the clinch nut is fixed to the sheet metal with the sheet metal retained between the end surface around the recess portion and the flange portion of the flange up washer.

The reinforcement tubular projection of the flange up washer according to the fifth aspect of the invention may be formed previously by way of fluing. Alternatively, the reinforcement tubular projection may be formed by way of fluing upon deforming the flange up washer with regard to the peripheral wall of the recess portion of the clinch nut.

According to a sixth aspect of the invention, there is provided a method of producing a clinch nut according to the first aspect of the invention, comprising the steps of:
forming a bead-like excess metal portion on a semi-finished molding product at one end having a recess portion and at the innermost periphery adjacent to the recess portion; and
stamping the excess metal portion so as to form an engaging part around the peripheral wall of the recess portion.

In such a method, since the bead-like excess metal portion to be stamped is provided on one end of the semi-finished molding product at the innermost periphery adjacent to the recess portion, when the bead-like excess metal portion is stamped, the engaging part, which projects from the peripheral wall of the recess portion, is formed by the plastic deformation. Therefore, the clinch nut is readily manufactured.

BRIEF DESCRIPTION OF THE DRAWINGS

Preferred embodiments of the present invention will be described below, by way of example only, with reference to the accompanying drawings, in which.

DESCRIPTION OF THE PREFERRED EMBODIMENT

With reference to the attached drawings, a clinch nut assembly and a method of producing a clinch nut according to the present invention will be described.

Figure 1:
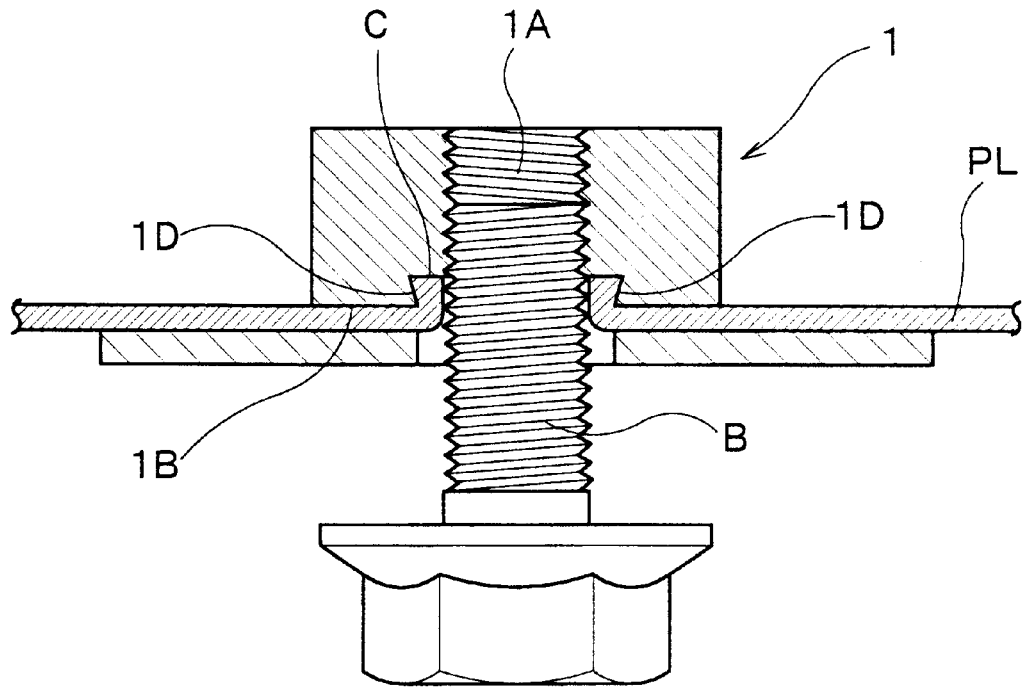
FIG. 1 is a sectional view showing a state of use of a clinch nut assembly according to a first aspect of the invention.
Figure 2:
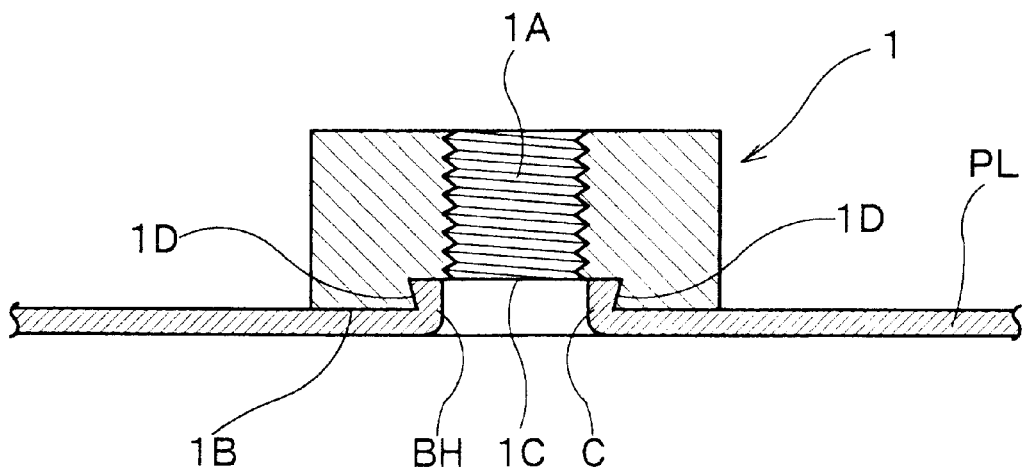
FIG. 2 is a sectional view depicting the clinch nut assembly of FIG. 1.
Figure 3:
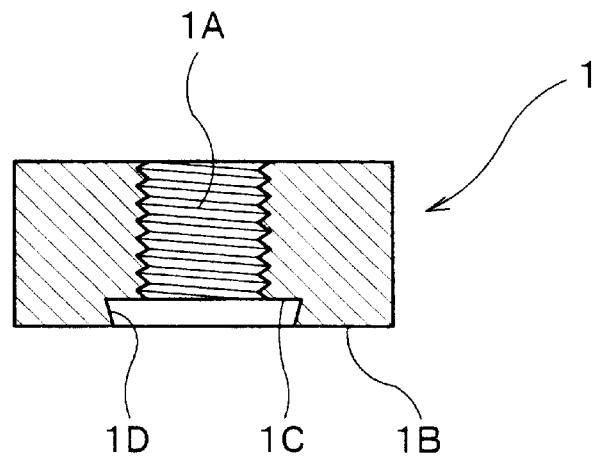
FIG. 3 is a sectional view of a clinch nut shown in FIG. 1.

As shown in FIGS. 1 and 2, a clinch nut 1 according to a first aspect of the invention is adapted to use with a sheet metal PL, such as a steel plate, a stainless steel plate and an aluminum plate. The clinch nut 1 is previously fixed to the sheet metal PL. The clinch nut 1 is provided at its center with a threaded hole 1A for the insertion of a bolt B. Provided at one end 1B of the clinch nut 1 facing to the sheet metal PL is a recess portion 1C for receiving a tubular projection C formed around a bolt insertion hole BH of the sheet metal PL. As shown in FIG. 3, an engaging part 1D is provided around a peripheral wall of the recess portion 1C for interlocking with the tubular projection C of the sheet metal PL.

The clinch nut 1 is a steel nut corresponding to the bolt B with the nominal diameter M6, and for example, the size of the clinch nut 1 is determined to be 16 mm in diameter, 8 mm in thickness and 2 mm in depth of the recess portion 1C. And the diameter of the recess portion 1C is, for example, 9 mm at the bottom portion and 7 mm at the mouth portion.

Figure 4:
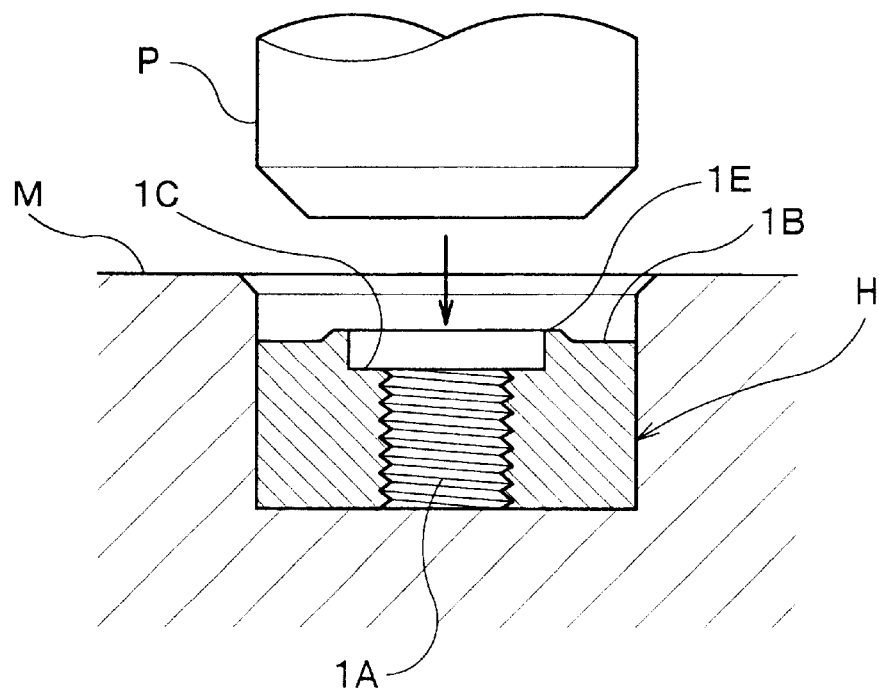
FIG. 4 is a sectional view explaining a process of making an engaging part of the clinch nut shown in FIG. 3.

With reference to FIG. 4, a method of producing the clinch nut 1 will be described. The engaging part 1D around the peripheral wall of the recess portion 1C is formed by stamping a semi-finished molding product H. The semi-finished molding product H is provided at one end 1B having a threaded hole 1A with a recess portion 1C, and a bead-like excess metal portion 1E is formed on the end 1B at the innermost periphery adjacent to the recess portion 1C.

The excess metal portion 1E is usually formed as a continuous ring along the innermost periphery of the end 1B, however, it may be formed as a discontinuous ring along the innermost periphery of the end 1B. The sectional shape of the excess metal portion 1E is usually tapered from the outer circumference for the purpose of facilitating plastic flow toward the peripheral wall of the recess portion 1C. However, it may be formed arcuately. The sectional area of the excess metal portion 1E is determined in accordance with the sectional area of the engaging part 1D provided around the peripheral wall of the recess portion 1C.

In the stamping process of the semi-finished molding product H, the molding product H is placed within a mold M with the bead-like excess metal portion 1E positioned upward, and the excess metal portion 1E is stamped by a punch P. When stamping the excess metal portion 1E, a reverse tapered engaging part 1D having an inclination angle of 20 to 30 degrees (FIG. 3) is formed.

Figure 5:
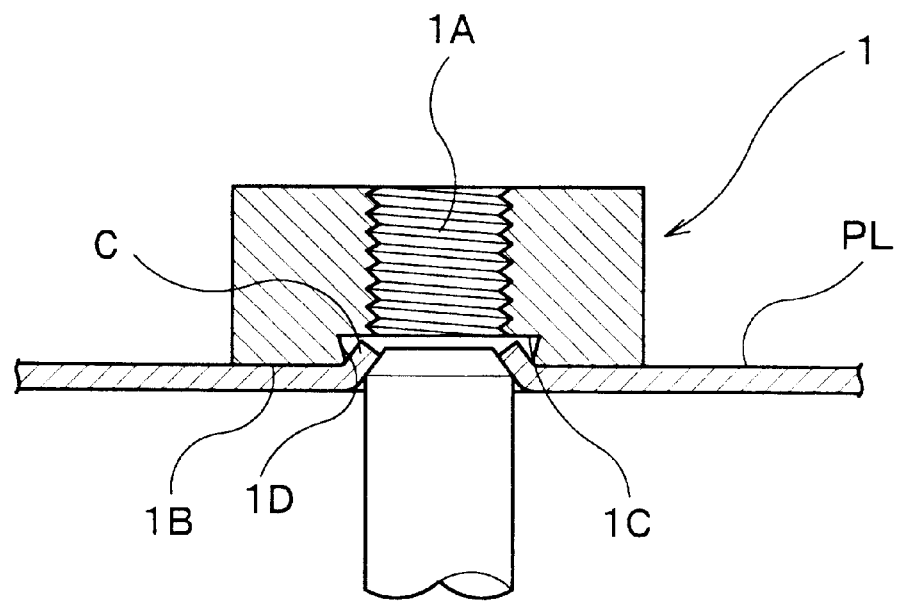
FIG. 5 is a sectional view explaining a process of forcibly deforming a sheet metal with regard to the clinch nut of FIG. 3.

As shown in FIG. 5, the clinch nut 1 produced as above is placed on the sheet metal PL with the end surface 1B contacting with the sheet metal PL, and the tubular projection C of the sheet metal PL is forcibly punched for interlocking with the recess portion 1C of the clinch nut 1. With this fluing process, the tubular projection C fitted within the recess portion 1C is interlocked with the engaging part 1D around the peripheral wall of the recess portion 1C. Accordingly, the clinch nut 1 is fixed to the sheet metal PL with the whole end surface 1B around the recess portion 1C contacting with the sheet metal PL, such as shown in FIG. 2. And as shown in FIG. 1, the bolt B is screwed into the threaded hole 1A through the sheet metal B, thereby retaining the sheet metal PL and an appropriate platemember connected thereto between the end surface 1B and the bolt head.

As shown in FIG. 1, when the bolt B is screwed into the clinch nut 1, the bolt B restricts a deformation of the tubular projection C toward the inner periphery. Therefore, the interlocking state of the tubular projection C with regard to the clinch nut 1 is securely retained.

According to the clinch nut 1, the diameter of the recess portion 1C can be reduced in accordance with the outer diameter of the tubular projection C of the sheet metal PL, and a sufficient contacting area can be kept on the end surface 1B around the recess portion 1c. Therefore, in comparison with the conventional clinch nut and pierce nut, a sufficient contacting area can be kept with regard to the sheet metal PL, even if the diameter of the clinch nut 1 is reduced. As a result, a plurality of clinch nuts 1 can be fixed to a smaller sheet metal PL, such as a small-sized bracket or flange, with a small pitch interval. Further, even if the sheet metal PL is a flexible aluminum plate, the clinch nut 1 does not sink into the sheet metal PL upon screwing the bolt B. Therefore, the clinch nut 1 does not loosen, and a sufficient tightening force can be obtained between the clinch nut 1 and the bolt B.

Figure 6:
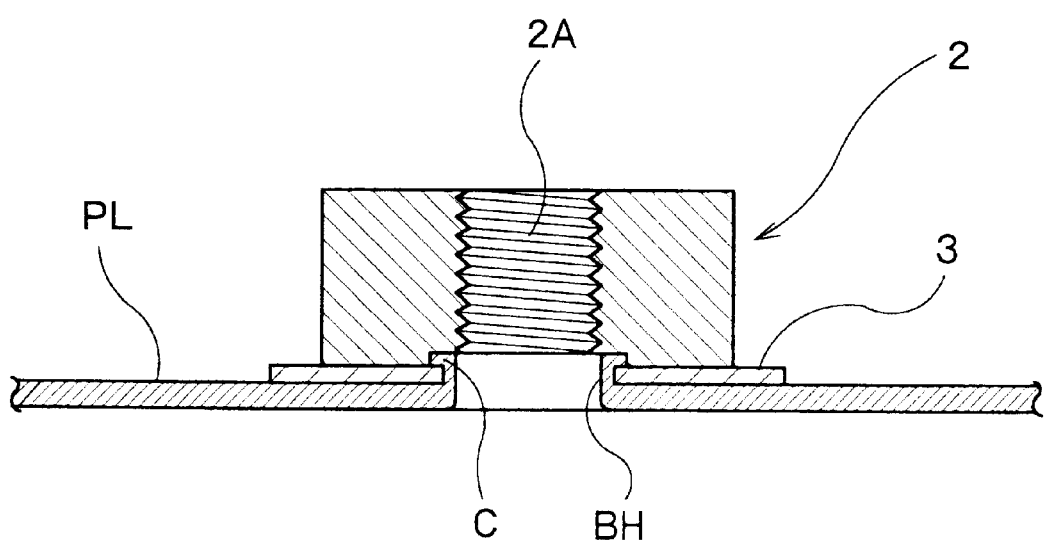
FIG. 6 is a sectional view showing a clinch nut assembly according to a second aspect of the invention.
Figure 7:
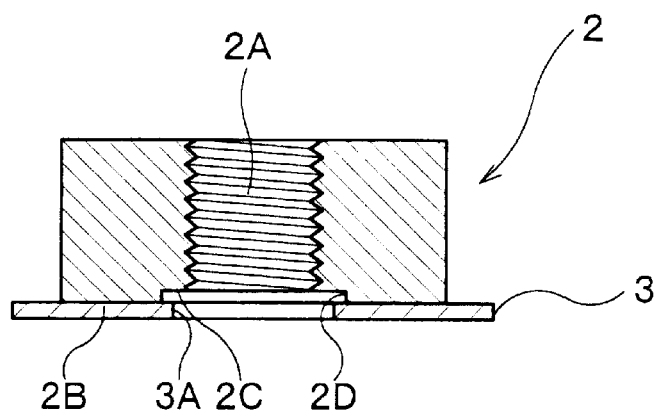
FIG. 7 is a sectional view of a clinch nut shown in FIG. 6.

With reference to FIGS. 6 and 7, a clinch nut assembly according to a second aspect of the invention will be described. Similar to the clinch nut 1, a clinch nut 2 according to the second aspect of the invention is a steel nut adapted to use with a sheet metal PL. The clinch nut 1 is previously fixed to the sheet metal PL. The clinch nut 2 is provided at its center with a threaded hole 2A for the insertion of a bolt B with the nominal diameter M6. Provided at one end 2B of the clinch nut 2 facing to the sheet metal PL is a recess portion 2C for receiving a tubular projection C formed around a bolt insertion hole BH of the sheet metal PL. A washer member 3 is welded on the end 2B of the clinch nut 2 so as to be concentric with the clinch nut 2. The washer member 3 is welded by means of resistance welding or the like.

The clinch nut 2 has substantially the same diameter and thickness as the clinch nut 1. However, the recess portion 2C is formed as a straight circular shape having about 9 mm in diameter, and the depth of the recess portion 2C becomes shorter than that of the recess portion 1C of the clinch nut 1 for the thickness equivalent to the washer member 3.

The washer member 3 is made of steel, and the size thereof is 20 mm in diameter and 1 mm in thickness. The inner diameter of the washer member 3 is about 7 mm, which is smaller than the diameter of the recess portion 2C. As shown in FIG. 7, an inner peripheral fringe 3A of the washer member 3 projects concentrically and inwardly from the peripheral wall 2D of the recess portion 2C and forms an engaging part which interlocks with the tubular projection C of the sheet metal PL.

The washer member 3 may be any plate-like member having a circular hole, which allows an insertion of the tubular projection C of the sheet metal PL. The outer profile of the washer member 3 is not limited to a circular shape, and it may be polygonal, such as square and hexagonal. The outside dimension of the washer member 3 may be the same as the clinch nut 2. The diameter and the thickness of the hole of the washer member 3 are decided in accordance with the thickness of the sheet metal PL, and as long as retaining a function as an engaging part for interlocking with the tubular projection C, they can be varied.

The clinch nut 2 produced as above is placed on the sheet metal PL with the washer member 3 contacting with the sheet metal PL, and the tubular projection C of the sheet metal PL is forcibly punched from the inner periphery of the washer member 3 toward the recess portion 2C of the clinch nut 2 for interlocking with the recess portion 2C. With this fluing process, the tubular projection C fitted within the recess portion 2C is interlocked with the inner peripheral fringe 3A of the washer member 3, which inwardly projects from the peripheral wall 2D of the recess portion 2C. Accordingly, the clinch nut 2 is fixed to the sheet metal PL with the whole surface of the washer member 3 contacting with the sheet metal PL, such as shown in FIG. 6.

Similar to the first aspect of the invention, the clinch nut assembly according to the second aspect of the invention retains the sheet metal PL and an appropriate plate member connected thereto between the bolt head (not shown) and the washer member 3 with the bolt (not shown) screwed into the threaded hole 2A of the clinch nut 2 through the sheet metal PL. When the bolt is screwed into the tubular projection C of the sheet metal PL, the bolt restricts a deformation of the tubular projection C toward the inner periphery. Therefore, the interlocking state of the tubular projection C with regard to the inner peripheral fringe of the washer member 3 is securely retained.

According to the clinch nut 2, even if the outer diameter of the washer member 3 is reduced incomparison with the conventional clinch nut and pierce nut, a sufficient contacting area can be kept with regard to the sheet metal PL. As a result, a plurality of clinch nuts 2 can be fixed to a smaller sheet metal PL, such as a small-sized bracket or flange, with a small pitch interval. Further, even if the sheet metal PL is a flexible aluminum plate, the clinch nut 2 does not sink into the sheet metal PL upon screwing the bolt. Therefore, the clinch nut 2 does not loosen, and a sufficient tightening force can be obtained between the clinch nut 2 and the bolt.

Figure 8:
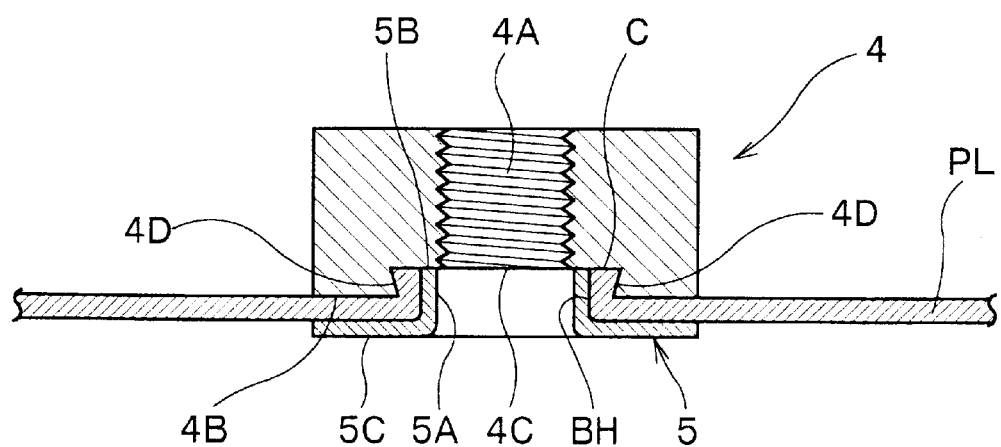
FIG. 8 is a sectional view showing a clinch nut assembly according to a third aspect of the invention.

With reference to FIG. 8, a clinch nut assembly according to a third aspect of the invention will be described. A clinch nut 4 according to the third aspect of the invention is substantially the same as the clinch nut 1, and it is provided with a threaded hole 4A, an end surface 4B, a recess portion 4C and an engaging part 4D. A flange up washer 5 is mounted on the clinch nut 4.

The flange up washer 5 is a washer, in which a reinforcement tubular projection 5B with a bolt insertion hole 5A is formed by way of fluing at a center of its flange portion. A bolt B (FIG. 1) is screwed into the clinch nut 4 through the bolt insertion hole 5A. The reinforcement tubular projection 5B of the flange up washer 5 is formed together with the tubular projection C of the sheet metal PL after attaching the flange portion 5C to the sheet metal and fluing or flanging up them. As a result, the tubular projection C of the sheet metal PL is interlocked with the engaging part 4D provided around the peripheral wall of the recess portion 4C of the clinch nut 4, thereby firmly retaining the interlocking state of the tubular projection C with the reinforcement tubular projection 5B of the flange up washer 5 pressing the inner periphery of the tubular projection C. For this reason, the flange up washer 5 is preferably made of steel with high stiffness so as to firmly retain the interlocking state with regard to the tubular projection C of the sheet metal PL.

The flange portion 5C of the flange up washer 5 is not limited to a circular shape and may be polygonal, such as square and hexagonal. However, it is usually formed as a circular shape with substantially the same outside dimension of the clinch nut. The reinforcement tubular projection 5B of the flange up washer 5 may be formed previously and individually by way of fluing. In this instance, the tubular projection C of the sheet metal PL is forcibly deformed with there reinforcement tubular projection 5B of the flange up washer 5 pressing the sheet metal PL.

In the clinch nut assembly according to the third aspect of the invention, since the reinforcement tubular projection 5B of the flange up washer 5 presses the inner periphery of the tubular projection C of the sheet metal PL and retains the interlocking state of the tubular projection C, high connecting strength between the tubular projection C of the sheet metal PL and the engaging part 4D of the clinch nut 4 is achieved, and hence the clinch nut 4 can be fixed much more firmly to the sheet metal PL. Therefore, the clinch nut assembly according to the third aspect of the invention can achieve the similar advantages of the clinch nut assembly according to the first aspect of the invention, and further more, since the clinch nut 4 can be fixed much more firmly to the sheet metal PL, the clinch nut 4 does not fall undesirably when hammering the clinch nut for the purpose of position adjustment.

Figure 9:
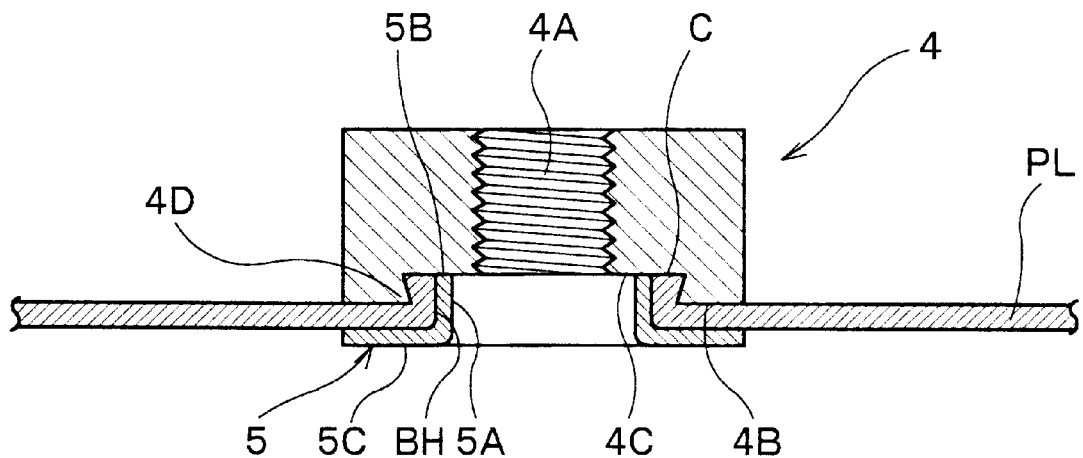
FIG. 9 is a sectional view depicting a modified embodiment of the clinch nut assembly shown in FIG. 8.

FIG. 9 shows a modified embodiment of the clinch nut assembly of FIG. 8, in which the clinch nut 4 has an enlarged recess portion 4C with extended diameter. This clinch nut assembly can also achieve the similar advantages of the clinch nut assembly according to the first aspect of the invention, and further more, since the clinch nut 4 can be fixed much more firmly to the sheet metal PL, the clinch nut 4 does not fall undesirably when hammering the clinch nut for the purpose of position adjustment.

Figure 10:
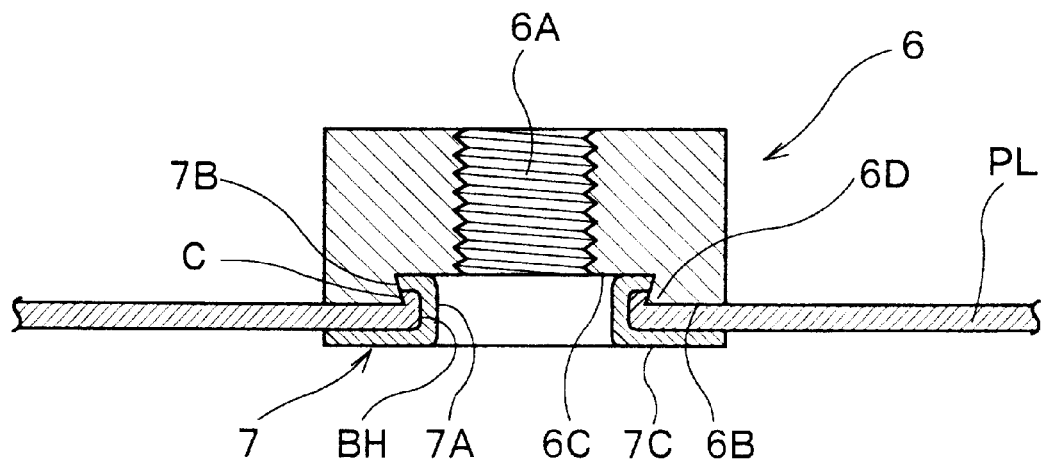
FIG. 10 is a sectional view depicting another modified embodiment of the clinch nut assembly shown in FIG. 8.

With reference to FIG. 10, another modified embodiment of the clinch nut assembly according to the third aspect of the invention will be described. A clinch nut 6 according to this modified embodiment is substantially the same as the clinch nut 1, and it is provided with a threaded hole 6A, an end surface 6B, a recess portion 6C and an engaging part 6D. The clinch nut assembly comprises a flange up washer 7, which is substantially the same as the flange up washer 5 shown in FIG. 8 and is provided with a bolt insertion hole 7A, a reinforcement tubular projection 7B and a flange portion 7C.

The flange up washer 7 is mounted on the clinch nut 4 in such a way that a front end of the reinforcement tubular projection 7B is bent outwardly so as to encompass the tubular projection C of the sheet metal PL. The front end of the reinforcement tubular projection 7B is forcibly deformed together with the tubular projection C of the sheet metal PL and fixed to the engaging part 6D around the recess portion 6C of the clinch nut 6.

According to this clinch nut assembly, since the reinforcement tubular projection 7B of the flange up washer 7 presses the inner periphery of the tubular projection C of the sheet metal PL and retains the interlocking state of the tubular projection C, and further the front end of the reinforcement tubular projection 7B is forcibly deformed and fixed to the engaging part 6D of the clinch nut 6, the clinch nut 6 can be fixed much more firmly to the sheet metal PL. Therefore, the clinch nut assembly according to this modified embodiment can achieve the similar advantages of the clinch nut assembly according to the first aspect of the invention, and further more, the clinch nut 6 does not fall undesirably when hammering the clinch nut for the purpose of position adjustment.

Figure 11:
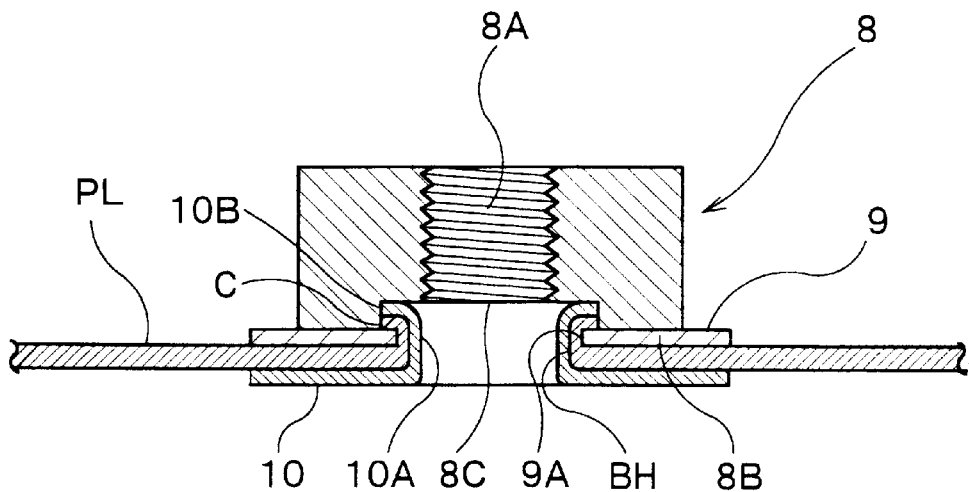
FIG. 11 is a sectional view depicting still another modified embodiment of the clinch nut assembly shown in FIG. 8.

With reference to FIG. 11, still another modified embodiment of the clinch nut assembly according to the third aspect of the invention will be described. A clinch nut 8 according to this modified embodiment is substantially the same as the clinch nut 2, and it is provided with a threaded hole 8A, an end surface 8B and a recess portion 8C. At the end surface 8B of the clinch nut 8, a washer member 9, which is substantially the same as the washer member 3, is mounted. The clinch nut assembly comprises a flange up washer 10, which is substantially the same as the flange up washer 7 shown in FIG. 10 and is provided with a bolt insertion hole 10A, a reinforcement tubular projection 10B and a flange portion 10C.

The flange up washer 10 is mounted on the clinch nut 8 in such a way that a front end of the reinforcement tubular projection 10B is bent outwardly so as to encompass the tubular projection C of the sheet metal PL. The front end of the reinforcement tubular projection 10B is forcibly deformed together with the tubular projection C of the sheet metal PL and fixed to the inner peripheral fringe 9A of the washer member 9 which inwardly projects from the peripheral wall of the recess portion 8C of the clinch nut 8.

According to this clinch nut assembly, since the reinforcement tubular projection 10B of the flange up washer 10 presses the inner periphery of the tubular projection C of the sheet metal PL and retains the interlocking state of the tubular projection C, and further the front end of the reinforcement tubular projection 10B is forcibly deformed and fixed to the inner peripheral fringe 9A of the washer member 9 which inwardly projects from the peripheral wall of the recess portion 8C of the clinch nut 8, the clinch nut 8 can be fixed much more firmly to the sheet metal PL. Therefore, the clinch nut assembly according to this modified embodiment can achieve the similar advantages of the clinch nut assembly according to the second aspect of the invention, and furthermore, the clinch nut 8 does not fall undesirably when hammering the clinch nut 8 for the purpose of position adjustment.

Figure 12:
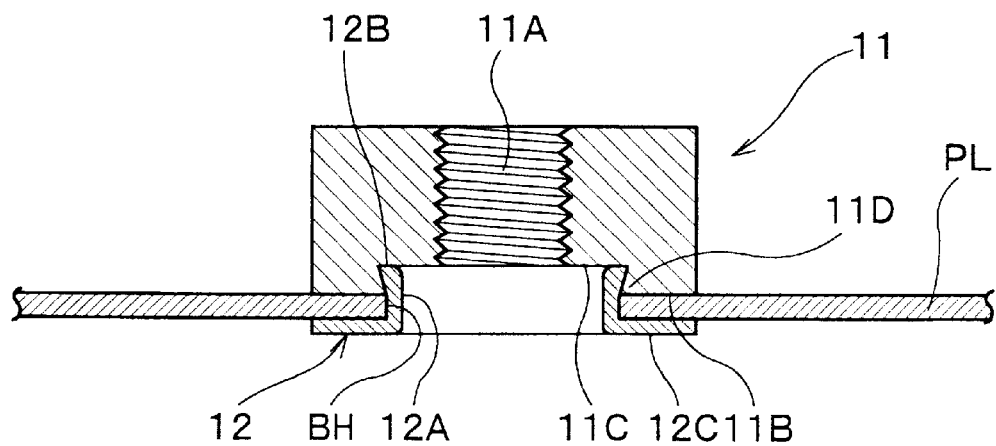
FIG. 12 is a sectional view showing a clinch nut assembly according to a fifth aspect of the invention.

With reference to FIG. 12, a clinch nut assembly according to a fifth aspect of the invention will be described. A clinch nut 11 according to the fifth aspect of the invention is substantially the same as the clinch nut 1, and it is provided with a threaded hole 11A, an end surface 11B, a recess portion 11C and an engaging part 11D. The clinch nut assembly further comprises a flange up washer 12, which is substantially the same as the flange up washer 5 of FIG. 8 and is provided with a bolt insertion hole 12A, a tubular projection 12B and a flange portion 12C.

The tubular projection 12B of the flange up washer 12 is inserted through the bolt insertion hole BH of the sheet metal PL and is received within the recess portion 11C of the clinch nut 11. The tubular projection 12B is interlocked with the engaging part 11D provided around the recess portion 11C of the clinch nut 11.

In the clinch nut assembly according to the fifth aspect of the invention, the tubular projection 12B of the flange up washer 12 is fitted into the recess portion 11C formed at the end surface 11B of the clinch nut 11 through the bolt insertion hole BH of the sheet metal PL. And the tubular projection 12B is forcibly deformed and fixed to the engaging part 11D around the peripheral wall of the recess portion 1C. Therefore, the clinch nut 11 is fixed to the sheet metal PL with the sheet metal PL retained between the end surface 11B around the recess portion 11C and the flange portion 12C of the flange up washer 12. The clinch nut assembly according to the fifth aspect of the invention can achieve the similar advantages of the clinch nut assembly according to the first aspect of the invention, and further more, the fluing operation is not required for the sheet metal PL to provide a tubular projection, leading to reduced working process of the sheet metal PL. Further, in comparison with the clinch nut assemblies shown in FIGS. 8 and 9, the clinch nut 11 is interlocked with the sheet metal PL only by deforming the tubular projection 12B, leading to uniform fastening of the clinch nut.

In this clinch nut assembly, serration or the like is preferably provided at the end surface 11B of the clinch nut 11 so as to prevent an idle turn upon screwing the bolt B, such as shown in FIG. 1.

Figure 13:
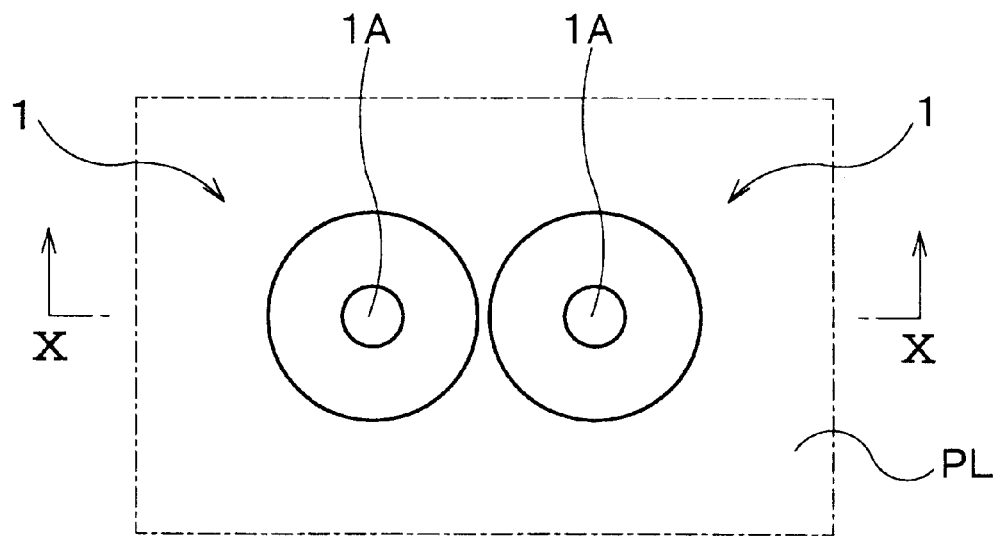
FIG. 13 is a plan view depicting two adjacent clinch nuts of FIG. 3 fixed to a sheet metal with a small pitch interval.
Figure 14:
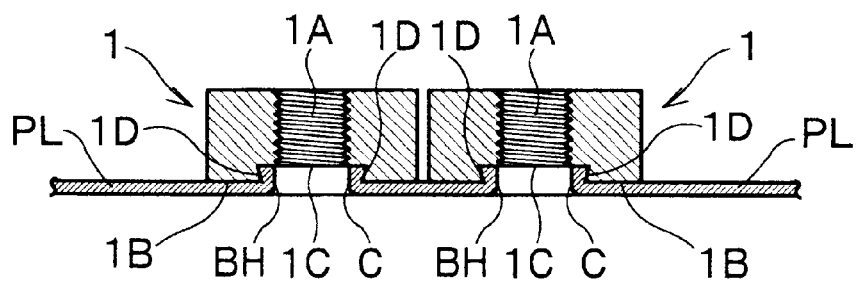
FIG. 14 is a sectional view taken on line X—X in FIG. 13.

As shown in FIGS. 13 and 14, the clinch nut assembly according to the first aspect of the invention can increase the fastening strength, if two clinch nuts 1 are fixed to the sheet metal PL with small pitch interval and the bolts are screwed into the corresponding threaded holes. This can be said to the clinch nut 2 according to the second aspect of the invention.

Figure 15:
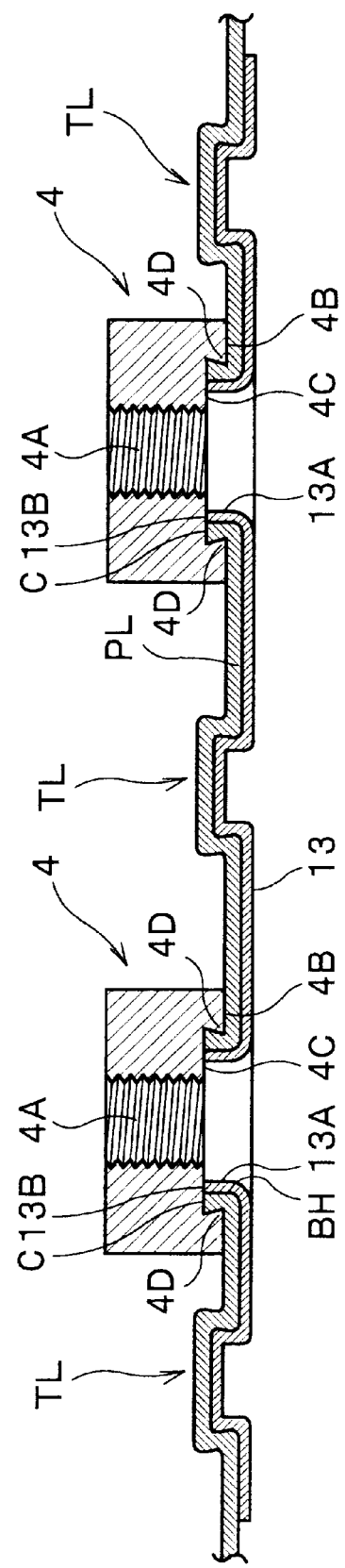
FIG. 15 is a sectional view showing a clinch nut assembly according to a fourth aspect of the invention.
Figure 16:
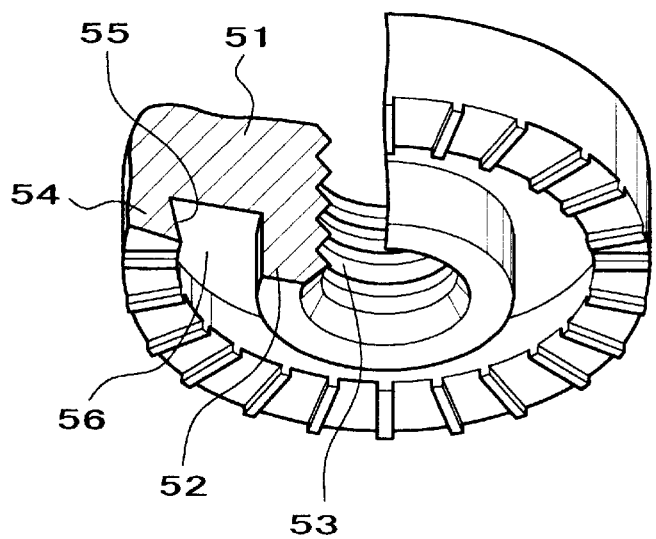
FIG. 16 is a perspective view showing a prior art clinch nut.
Figure 17:
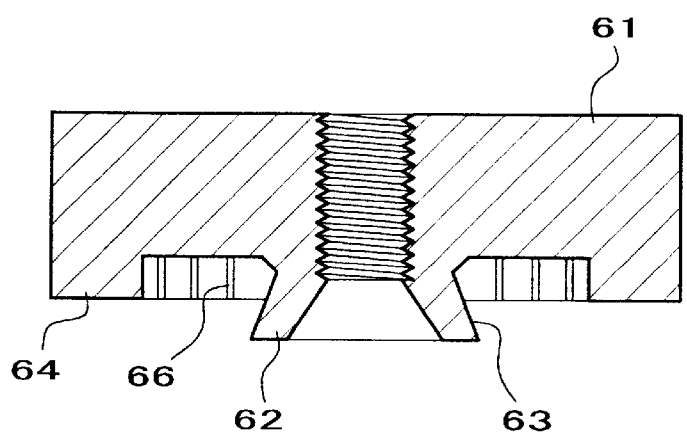
FIG. 17 is a sectional view showing a prior art pierce nut.

FIG. 15 shows a clinch nut assembly according to a fourth aspect of the invention. This clinch nut assembly is substantially the same as that shown in FIG. 8, however, a flange up washer plate 13 is employed instead of the flange up washer 5. The flange up washer plate 13 is a plate member formed by a plurality of continuous flange up washers 5, and it is provided with a plurality of bolt insertion holes 13A and reinforcement tubular projections 13B corresponding to the bolt insertion hole 5A and the reinforcement tubular projection 5B, respectively. A plurality of adjacent tubular projections C are formed on the sheet metal PL, and each of the reinforcement tubular projections 13B presses an inner peripheral surface of the corresponding tubular projection C for retaining the interlocking state of the tubular projections C with regard to the clinch nuts 4. In order to prevent a clearance between the flange up washer plate 13 and the sheet metal PL, the sheet metal PL is crimped between the adjacent clinch nuts 4 so as to securely hold the flange up washer plate 13. The flange up washer plate 13 and the sheet metal PL may be connected through self-piercing rivets or drive rivets.

The clinch nut 4 is used, such as for fixing a hood striker of the engine hood with bolts. In this clinch nut assembly, each of the reinforcement tubular projections 13Bof the flange up washer plate 13 presses the inner peripheral surface of the corresponding tubular projection C of the sheet metal PL so as to securely fix the adjacent clinch nuts 4 to the flange up washer plate 13. This clinch nut assembly can achieve the similar advantages of the clinch nut assembly according to the first aspect of the invention, and additionally, a plurality of adjacent clinch nuts 4 can be fixed much more firmly to the sheet metal PL.

While the invention has been described in detail and with reference to specific embodiments thereof, it will be apparent to one skilled in the art that various changes and modifications can be made therein without departing from the spirit and scope thereof.

For example, the aforementioned clinch nuts 1, 2, 4, 6, 8 and 11 are corresponding to a bolt with the nominal diameter M6, however, the clinch nut according to the invention may be manufactured in correspondence with a bolt with other nominal diameters. Especially, if the clinch nut corresponds to a bolt with the nominal diameter greater than M6, the outside dimension of the clinch nut or the outside dimension of the washer member can be decreased in comparison with the conventional clinch nut or pierce nut.

Further, in the clinch nuts 2 and 8 according to the second aspect and fifth aspect of the invention, a rough surface portion such as serration or the like may be provided at the inner peripheral fringe 3A, 9A of the washer member 3, 9 so as to securely fix the rotation of the tubular projection C of the sheet metal PL with regard to the washer member 3.

What is claimed is:

1. A clinch nut assembly comprising:

a sheet metal plate having a tubular projection that defines a bolt insertion hole having an inner diameter; and a clinch nut fixed to said sheet metal plate, said nut including a threaded hole for receiving a bolt, said threaded hole having an inner diameter that is substantially equal to the inner diameter of said bolt insertion hole such that no gap exists between the tubular projection and the bolt that is subsequently screwed into the clinch nut to fix an object to the clinch nut assembly, and said clinch nut includes a recess portion at one end facing to the sheet metal plate that receives said tubular projection, and said recess portion includes a peripheral wall that defines an engaging part that is interlocked with said tubular projection.

2. A clinch nut assembly according to claim 1, wherein a flange up washer with a reinforcement tubular projection is further included, said reinforcement tubular projection pressing an inner peripheral surface of the tubular projection of said sheet metal for interlocking said tubular projection with the clinch nut.

3. A clinch nut assembly according to claims 2, wherein a front end of said reinforcement tubular projection is bent outwardly so as to encompass the tubular projection of said sheet metal.

4. A clinch nut assembly according to claim 1, wherein said sheet metal has a plurality of adjacent bolt insertion holes, and wherein a flange up washer plate with a plurality of reinforcement tubular projections is attached to said sheet metal in such a way that each of said plurality of reinforcement tubular projections presses an inner peripheral surface of the corresponding tubular projection for interlocking the tubular projection with the clinch nut.

5. A clinch nut assembly according to claim 4, wherein a front end of said reinforcement tubular projection is bent outwardly so as to encompass the tubular projection of said sheet metal.

* * * * *